(12) United States Patent
Yamatsu et al.

(10) Patent No.: US 7,595,922 B2
(45) Date of Patent: Sep. 29, 2009

(54) HOLOGRAM RECONSTRUCTING APPARATUS AND HOLOGRAM RECONSTRUCTING METHOD

(75) Inventors: Hisayuki Yamatsu, Tokyo (JP); Norihiro Tanabe, Saitama (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 11/612,155

(22) Filed: Dec. 18, 2006

(65) Prior Publication Data
US 2007/0171494 A1      Jul. 26, 2007

(30) Foreign Application Priority Data
Jan. 25, 2006    (JP) .............................. 2006-015959

(51) Int. Cl.
*G03H 1/26* (2006.01)
*G03H 1/22* (2006.01)

(52) U.S. Cl. ............................. 359/22; 359/32; 369/103

(58) Field of Classification Search ................... 359/21, 359/22, 24, 32, 33; 369/103
See application file for complete search history.

(56) References Cited

U.S. PATENT DOCUMENTS
2006/0039051 A1 *    2/2006   Baba et al. .................... 359/35

FOREIGN PATENT DOCUMENTS
JP     2005-234179          9/2005

* cited by examiner

*Primary Examiner*—Alessandro Amari
(74) *Attorney, Agent, or Firm*—Oblon, Spivak, McClelland, Maier & Neustadt, L.L.P.

(57) ABSTRACT

A hologram reconstructing apparatus configured to irradiate a hologram recording medium that stores an interference pattern of a signal beam spatially modulated by data displayed on a spatial modulator and a reference beam emitted simultaneously with the signal beam with a reconstructing reference beam and to reconstruct data by capturing a reconstruction signal beam generated at the hologram recording medium being irradiated includes an image pickup unit that receives a partial reconstruction signal beam that constitutes part of the reconstruction signal beam by a full light-receiving plane; and a moving unit that relatively move the light-receiving surface of the image pickup means within an irradiation range of the reconstruction signal beam. All information included in the reconstruction signal beam is reconstructed by receiving the reconstruction signal beam corresponding to the entire irradiation range by relatively moving the image pickup means within the irradiation range of the reconstruction signal beam.

15 Claims, 6 Drawing Sheets

(OVER SAMPLING)

HOLOGRAM RECONSTRUCTING APPARATUS AND HOLOGRAM RECONSTRUCTING METHOD

CROSS REFERENCES TO RELATED APPLICATIONS

The present invention contains subject matter related to Japanese Patent Application JP 2006-015959 filed in the Japanese Patent Office on Jan. 25, 2006, the entire contents of which are incorporated herein by reference.

BACKGROUND OF THE INVENTION

1. Field of the Invention

The present invention relates to a hologram reconstructing apparatus configured to reconstruct data recorded on a hologram recoding medium and, more specifically, relates to a hologram reconstructing method of reconstructing a hologram by oversampling a signal obtained by an image sensor that receives a reconstruction signal beam so as to reconstruct data.

2. Description of the Related Art

Recently, rapid development in holographic technologies has been carried out to put holographic memories that have been drawing attention as candidates of large-capacity storage capable of competing against next-generation and next-next-generation optical disks to practical use. Holographic data storage systems for recording and reconstructing large-volume data by employing holographic technologies have been developed.

A holograph recording and reconstructing apparatus (volume hologram memory) records an interference pattern of coherent signal and reference beams in a hologram recording medium (such as photopolymer), generates a reconstruction signal beam by irradiating the hologram recording medium with the same reference beam that was used for recording, and obtains a reconstruction image signal by photoelectrically converting the reconstruction signal beam using an image pickup device, such as a CCD. Since the entire volume of a hologram recording medium is used for recording, with hologram recording, a hologram recording medium is possible to have a significantly greater recording density and recording capacity compared with a known optical disk memory used for two-dimensional information recording.

For such a volume hologram memory, a multiplex recording method is employed to increase recording density by recording a plurality of independent pages at a same area in the hologram recording medium. There are various multiplex recording methods, and some typical methods may include angle multiplexing, polytopic multiplexing, shift multiplexing, phase-code multiplexing, and speckle multiplexing.

FIG. 5 is a block diagram illustrating the structure of a typical hologram recording and reconstructing apparatus employing an angle multiplexing method (for example, refer to Japanese Unexamined Patent Application Publication No. 2005-234179). When recording data in a hologram recording medium 60 using the apparatus illustrated in FIG. 5, while a shutter 2 is closed (during recording, a shutter 5 is always closed), a data page to be recorded is displayed on a spatial modulator (transmissive liquid crystal device) 7 and a spindle motor 10 is rotated to determine the recording site (recording area) in the hologram recording medium 60. Then, after the angle of a movable mirror 9 is determined, the shutter 2 is opened.

Accordingly, a coherent laser beam emitted from a laser beam source 1 enters a beam expander 3 through the shutter 2. In this way, the beam diameter is increased to a diameter that completely covers the modulation area of the spatial modulator 7. Subsequently, the laser beam enters a beam splitter 4 and is split into a signal beam 100 and a reference beam 200. The reference beam 200 is deflected by a movable mirror 9, and is emitted at the hologram recording medium 60 via an optical system for changing the incident angle of the reference beam to the medium (not shown). The incident angle of the reference beam 200 to the hologram recording medium 60 corresponds to the angle of the movable mirror 9.

The signal beam 100 is incident on the spatial modulator 7 via the optical unit 6. Spatial modulation (amplitude modulation) is carried out on the signal beam 100 that passes through the spatial modulator 7 displaying a data page. The spatial modulator 7 includes, for example, a liquid crystal display and generates a spatial modulation pattern, such as that shown in FIG. 6A, by independently changing the transmittance of the pixels. The spatially modulated signal beam 100 is emitted through a signal beam lens 8 so that it overlaps with the reference beam 200 in the hologram recording medium 60. The reference beam 200 and the signal beam 100 that are emitted at the hologram recording medium 60 interfere with each other in the medium 60. A light intensity distribution of the interference pattern that is generated as a result is recorded in the hologram recording medium 60. Then, the shutter 2 is closed.

Subsequently, the next data page to be recorded is displayed on the spatial modulator 7, and, at the same time, the movable mirror 9 rotates slightly so that its angle changes by a predetermined angle. In this state, the shutter 5 is opened to record an interference pattern of another reference beam 200 that has a slightly different incident angle to the hologram recording medium 60 and another signal beam 100 that has been spatially modulated by a data page that is to be recorded next is multiplex- recorded in the same the recording area used for the previous recording. This operation is repeated to multiplex-record a desired number of data pages in one area in the hologram recording medium 60. Subsequently, the hologram recording medium 60 is rotated to move the recording area with respect to the signal beam lens 8, and multiplexed recording is carried out in another recording area in the hologram recording medium 60.

To reconstruct a hologram recorded as described above, the shutter 2 is opened while the shutter 5 is closed so as to irradiate an area in the hologram recording medium 60 where the data page to be reconstructed is recorded with a reference beam 200 (although it is more accurate to refer to this beam as a "reconstructing reference beam," hereinafter this beam will be simply referred to as a "reference beam"). A hologram reconstruction signal beam 300 generated by the incident reference beam 200 forms an image on an image sensor 12, which is imaging means, via a reconstruction signal beam lens 11. The image sensor 12 is constituted of a CCD or CMOS image sensor that includes many pixels arranged two-dimensionally. By analyzing the intensity of the light incident on each pixel, the modulation pattern, such as that shown in FIG. 6A, is decoded. At this time, by changing the angle of the movable mirror 9, the data pages multiplex-recorded in the same recording area of the hologram recording medium 60 are separated and consecutively reconstructed.

To maximize the data capacity of one page of a hologram so as to maximize the recording capacity of a hologram recording medium, in general, an extremely large the number of pixels (display pixels), i.e., several tens of thousand to several hundreds of thousand pixels, are included in the spatial modulator 7. Therefore, to sufficiently reconstruct data by receiving a reconstruction signal beam once, the number of pixels (light-receiving pixels) included in the image sensor 12, as shown in FIG. 6B, must be at least the same as the number of pixels included in the spatial modulator 7. When the number of pixels included in the image sensor 12 is greater the number of pixels included in the spatial modulator 7, the reconstruction signal beam may be received by the image sensor 12 in a manner such that each pixel represented by the reconstruction signal beam is received by a plurality of pixels on the image sensor 12, in a manner such as that shown in FIG. 6C (i.e., the reconstruction signal beam is oversampled).

FIG. 6C illustrates an example of oversampling when the number of pixels included in the image sensor 12 is four times greater than that of the spatial modulator 7. Compared with a case in which oversampling is not carried out, when oversampling is carried out, the following advantages that contribute to an improvement in the recording density are achieved:

1) the level of degradation in the signal-to-noise ratio (SNR) caused by positional displacement of the reconstruction signal beam in the translational direction and the rotational direction on an image sensor light-receiving plane is low; and 2) the SNR of the light-receiving signal is improved by calculating the brightness of the received light among a plurality of pixels included in the image sensor 12.

SUMMARY OF THE INVENTION

When the above-described oversampling is carried out, in the past, a method in which an entire reconstruction signal image of a hologram is received at once has been employed. Therefore, to carry out oversampling, the number of pixels (light-receiving pixels) included in the image sensor 12 was required to always be larger than the number of pixels (display pixels) included in the spatial modulator 7. However, as described above, since the number of pixels included in the spatial modulator 7 may be several million, the number of pixels included in the image sensor 12 used for oversampling would be an enormous number because the number of pixels would be several times the number of pixels included in the spatial modulator 7. To realize such an image sensor has been difficult because of technological and economical problems. These problems in association with oversampling are not limited to the above-described angular multiplexing technique, but also occur when reconstruction is carried out with any type of hologram apparatus.

The present invention has taken into consideration the above-identified problems and provides a hologram reconstructing apparatus and a hologram reconstruction method that are capable of easily carrying out oversampling during hologram reconstruction at low cost by preventing the number of light-receiving pixels included in an image sensor from becoming greater than the number of display pixels included in a spatial modulator.

The present invention provides a hologram reconstructing apparatus configured to irradiate a hologram recording medium with a reconstructing reference beam, the hologram recording medium storing an interference pattern of a signal beam spatially modulated by data displayed on a spatial modulator and a reference beam emitted simultaneously with the signal beam, and to reconstruct data by capturing a reconstruction signal beam generated at the hologram recording medium being irradiated, the hologram reconstructing apparatus including an image pickup unit that receives a partial reconstruction signal beam by a full light-receiving plane, the partial reconstruction signal beam constituting part of the reconstruction signal beam; and a moving unit that relatively move the light-receiving surface of the image pickup means within an irradiation range of the reconstruction signal beam, wherein all information included in the reconstruction signal beam is reconstructed by receiving the reconstruction signal beam corresponding to the entire irradiation range by relatively moving the image pickup means within the irradiation range of the reconstruction signal beam.

The number of light-receiving pixels of the image pickup means is greater than the number of display pixels of the spatial modulator for displaying the data included in the partial reconstruction signal beam.

An embodiment of the present invention provides a hologram reconstruction method of irradiating a hologram recording medium with a reconstructing reference beam, the hologram recording medium storing an interference pattern of a signal beam spatially modulated by data displayed on a spatial modulator and a reference beam emitted simultaneously with the signal beam, and reconstructing data by capturing a reconstruction signal beam generated at the hologram recording medium being irradiated, the method comprising the steps of receiving a partial reconstruction signal beam constituting part of the reconstruction signal beam with an image sensor having a number of reception pixels greater than the number of display pixels included in the spatial modulator for displaying data included in the partial reconstruction signal beam and repeating the receiving step for other partial reconstruction signal beams of the reconstruction signal beam until all information included in the reconstruction signal beam is obtained.

According to an embodiment of the present invention, by receiving only part of a reconstruction signal beam by an image sensor positioned at an imaging plane of the reconstruction signal beam, the number of light-receiving pixels included in the image sensor is larger than the number of display pixels included in a spatial modulator for displaying part of the reconstruction signal beam, even when an image sensor that includes a number of pixels that is about equal to or less than the number of display pixels included in the spatial modulator and that can be produced at relatively low cost. Thus, oversampling can be easily carried out at reasonable cost.

According to an embodiment of the present invention, by receiving only part of a reconstruction signal beam with an image sensor positioned at an imaging plane of the reconstruction signal beam, an image sensor that can be produced at relatively low cost can be used to carry out oversampling. Thus, the level of degradation in the SNR caused by positional displacement of the reconstruction signal beam in the translational direction and the rotational direction on an image sensor light-receiving plane can be reduced, and the SNR of the light-receiving signal is improved by calculating the brightness of the received light among a plurality of pixels included in the image sensor. In this way, a high recording density hologram reconstructing apparatus capable of obtaining high quality reconstruction data can be provided at low cost.

DESCRIPTION OF THE PREFERRED EMBODIMENTS

Figure 1:
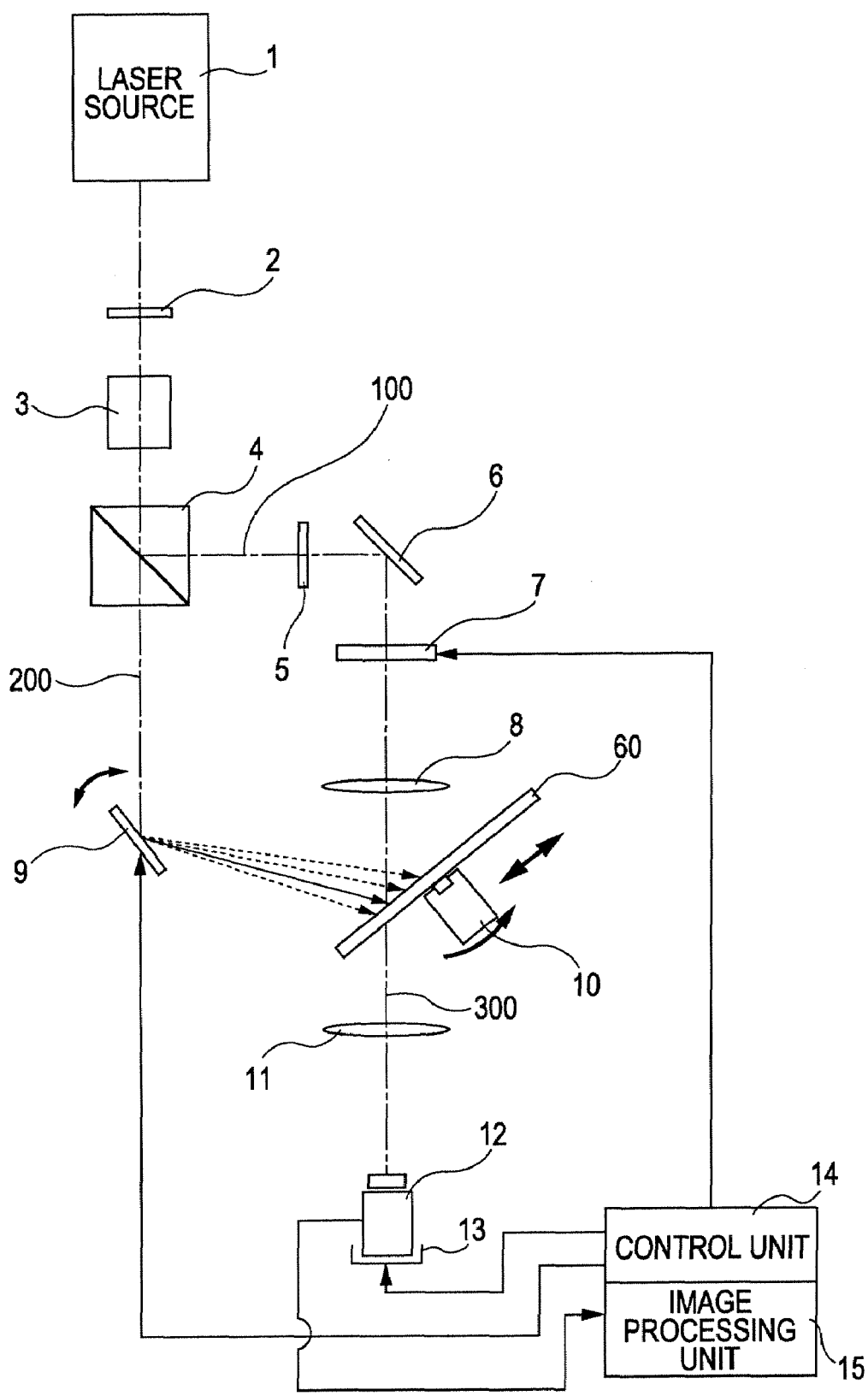
FIG. 1 is a block diagram illustrating the structure of a hologram recording and reconstructing apparatus according to an embodiment of the present invention.

FIG. 1 is a block diagram illustrating the structure of a hologram recording and reconstructing apparatus according to an embodiment of the present invention. Components that are the same as those of the apparatus according to the related art are represented by the same reference numerals thereof. The hologram recording and reconstructing apparatus includes a laser beam source 1, shutters 2 and 5, a beam expander 3, a mirror 6, a spatial modulator 7, a signal beam lens 8, a disk-shaped hologram recording medium (such as a photopolymer material) 60, a movable mirror 9, a spindle motor 10, a reconstruction signal beam lens 11, an image sensor 12, such as a CCD image sensor or a CMOS image sensor, a movable stage 13 for translationally moving the image sensor 12 on a plane, a control device 14, and an image processing unit 15. The control device 14 controls the entire apparatus and carries out display control of the spatial modulator 7, opening and closing control of the shutters 2 and 5, rotational angle control of the movable mirror 9, translational movement control of the movable stage 13, rotational control of the hologram recording medium 60. The image processing unit 15 generates image data by processing a photoelectric conversion signals from the image sensor 12.

The hologram apparatus according to this embodiment employs an angular multiplexing method in substantially the same manner as a known hologram apparatus and thus has a structure that is substantially the same as a known hologram apparatus, except that the image sensor 12 has a light-receiving plane having a size capable of receiving part of a reconstructed image formed by the reconstruction signal beam lens 11 and that the imaging plane of the reconstructed image is moved by the movable stage 13 so that other partial reconstruction signal beams can be received in order so as to convert the entire image into image data. According to this embodiment, the number of pixels included in the image sensor 12 is the same as the number of pixels included in the spatial modulator 7. When a poly-topic multiplexing technique is employed, the hologram apparatus illustrated in FIG. 1 can be used suitable as a poly-topic multiplexing hologram reconstructing apparatus by providing an aperture on the back side of the recording area (here, this area is not two-dimensional but is three-dimensional) in hologram recording medium 60 that is to be reconstructed.

A polytopic multiplexing technique is a multiplexing technique that is based on an angular multiplexing technique and that has been proposed by InPhase Technologies (USA) in 2004. Now the difference between polytopic multiplexing and angular multiplexing will be described. The only difference between the two types of multiplexing is whether or not an aperture (polytopic aperture) is provided behind a hologram recording medium. In other words, for polytopic multiplexing, an aperture is provided on the back side of the recording area in the hologram recording medium that is to be reconstructed. The aperture significantly improves recording density. In general, for angular multiplexing, a parallel reference beam is used. Therefore, when the hologram recording medium is irradiated with a reconstructing reference beam, a plurality of reconstructed images are obtained at the same time from the hologram multiplexing area to be reconstructed (in general, referred to as a 'book') and also from the adjacent books. When the books are too close to each other, the reconstructed images overlap with each other (inter-book crosstalk), making decoding extremely difficult. Therefore, with known angular multiplexing, the distance between the books could not be set very small, preventing the recording density from being improved. In contrast, with polytopic multiplexing, although a parallel reference beam is used, in the same manner as in angular multiplexing, the polytopic aperture blocks reconstructed images generated from books other than that to be reconstructed. Therefore, in polytopic multiplexing, the distance between the books can be reduced compared with that in known angular multiplexing, and the recording density can be significantly improved.

Next, operations according to this embodiment will be described. The operations of recording and reconstructing a reconstruction image carried out by the hologram apparatus according to this embodiment is basically the same as that according to a known hologram apparatus. Therefore, only characteristic points of the hologram apparatus according to this embodiment will be described. During recording, data pages that have been displayed on the spatial modulator 7 are multiplex-recorded by angular multiplexing in the same recording area in the hologram recording medium 60.

During reconstruction, when the hologram recording medium 60 is irradiated with a reference beam (reconstructing reference beam) 200 that is that same as that used for recording, a hologram reconstruction signal beam 300 corresponding to the incident angle of the reference beam 200 is generated. The hologram reconstruction signal beam 300 is transmitted through the reconstruction signal beam lens 11 so as to form a reconstruction image on a plane including the light-receiving plane of the image sensor 12. At this time, the imaging magnification of the reconstruction signal beam lens 11 is adjusted so that the size of the light-receiving plane of the image sensor 12 according to this embodiment is about ¼ of the entire reconstruction image. Thus, the image sensor 12 only receives part of the hologram reconstruction signal beam 300. By repeating this operation for the other parts of the hologram reconstruction signal beam 300, the entire hologram reconstruction signal beam 300 is finally received, and all information included in the hologram reconstruction signal beam 300 is reconstructed.

However, according to such a light-receiving operation, since the image sensor 12 receives part of the reconstructing image formed by the reconstruction signal beam lens 11, the number of pixels of the light-receiving plane is greater than the number of pixels of the spatial modulator 7 that is required for displaying the partial data corresponding to the part of the hologram reconstruction signal beam 300. For example, when the image sensor 12 receives ¼ of the hologram reconstruction signal beam 300 each time, the number of pixels of the image sensor 12 can be regarded as four time of that of the spatial modulator 7. Thus, when a partial reconstruction signal beam is received by the image sensor 12, oversampling is carried out. In this case, compared with a case in which oversampling of the entire hologram reconstruction signal beam 300 is carried out at once, the number of pixels included in the image sensor 12 may be the same or less than the number of pixels of the spatial modulator 7. Thus, an image sensor that is producible at low cost can be used.

Figure 2:
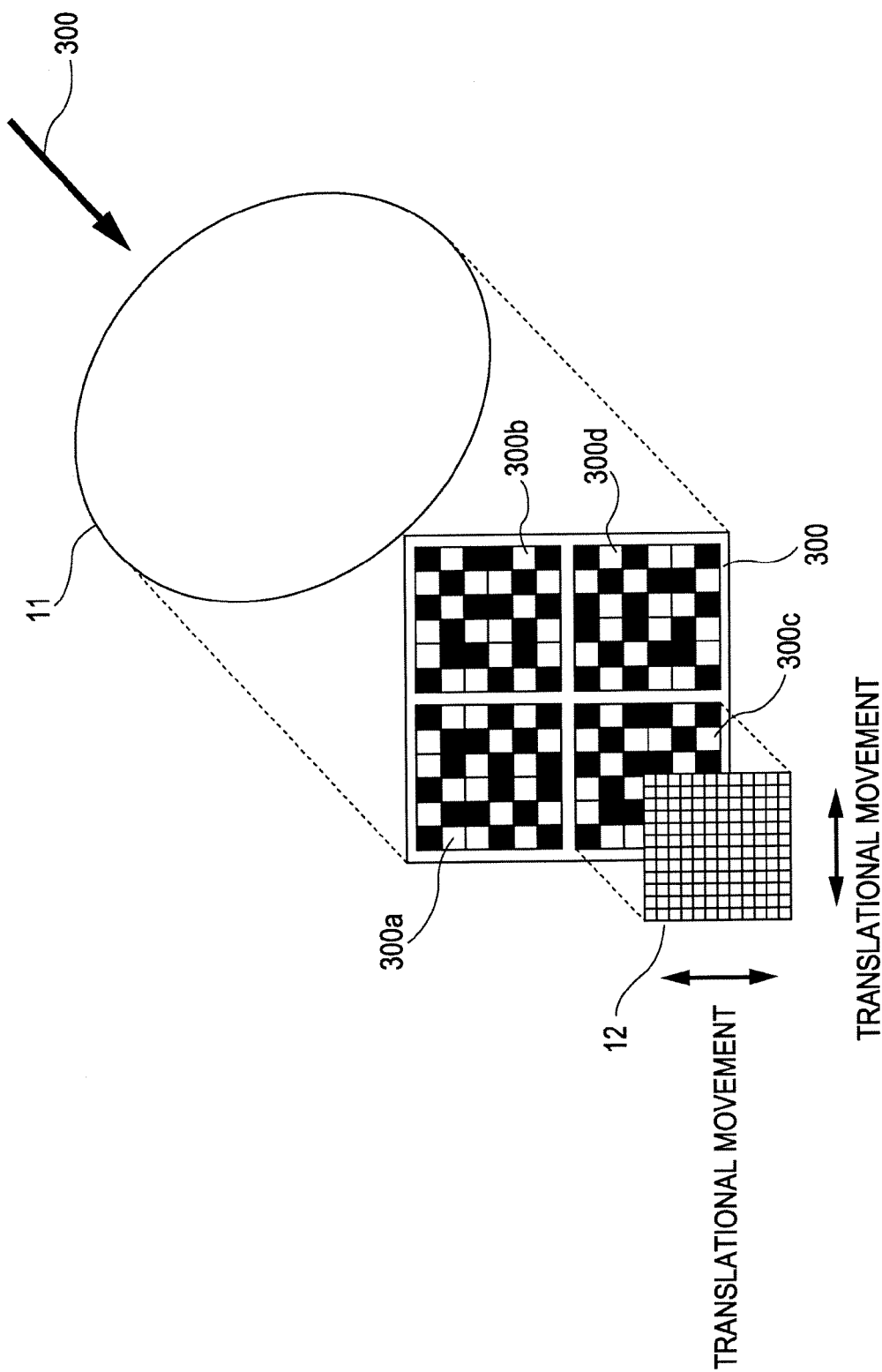
FIG. 2 illustrates an image sensor, shown in FIG. 1, receiving a partial reconstruction signal beam.

FIG. 2 illustrates a hologram reconstructing process according to an embodiment of the present invention. As illustrated in the drawing, the hologram reconstruction signal beam 300 is divided into four partial signal beams 300a to 300d, and each partial signal beam is independently received by the image sensor 12. For example, when a liquid crystal panel having a XGA resolution (1,024×768 pixels) is used as the spatial modulator 7, each partial signal beam illustrated in FIG. 2 can include a maximum data capacity of 1,024×768/4=24.6 kByte. In general, a high-pixel optical sensor, such as a CCD or a CMOS, is used as the image sensor 12, and an image corresponding to a partial signal beam is formed on the image sensor 12 by the reconstruction signal beam lens 11 with a suitable optical magnification.

FIG. 2 illustrates a case in which the imaging magnification of the reconstruction signal beam lens 11 is set so that each pixel of a partial signal beam is oversampled by four pixels of the image sensor 12 when a CMOS image sensor 12 whose number of pixels is the same as that of the spatial modulator 7 (i.e., the signal for an entire page) is used. After the reception of a partial signal beam is completed, the position of the image sensor 12 is translationally moved so as to receive a next partial signal beam. This operation is repeated until the entire hologram reconstruction signal beam 300 is finally received. At this time, the image sensor 12 is translationally moved on the imaging plane of the reconstruction signal beam by the movable stage 13 that is controlled by the control device 14 so that the partial signal beams 300a to 300d are received in order.

The image signal from the image sensor 12 is processed at the image processing unit 15. However, for example, when one photograph represented by a hologram reconstruction signal beam 300, the image signals obtained by receiving partial signal beams 300a to 300d are combined by using an image memory included in the image processing unit 15 to generate one image signal.

The number of pixels and the pixel pitch of the spatial modulator 7 and the image sensor 12 and the imaging magnification of the reconstruction signal beam lens 11 are variable, and various combinations of values can be employed depending on the ease of acquiring components and the optical design. When actually reconstructing a hologram, all partial signal beams of a reconstruction signal beam corresponding to one page that is generated from one recording multiplex area in the hologram recording medium 60 are received, and then, after the entire reconstruction signal beam is received, the reception of a reconstruction signal beam for another page may be started.

However, in such a case, the position of the image sensor 12 must be moved frequently, and, thus, there is a problem in that the transfer rate is significantly reduced compared with a known reconstructing method. To minimized the influence of this, after receiving one partial signal beam, instead of receiving the other partial signal beams of the same reconstruction signal beam, a partial signal beam corresponding to the same relative positions in a different reconstruction signal beam may be received.

Figure 3:
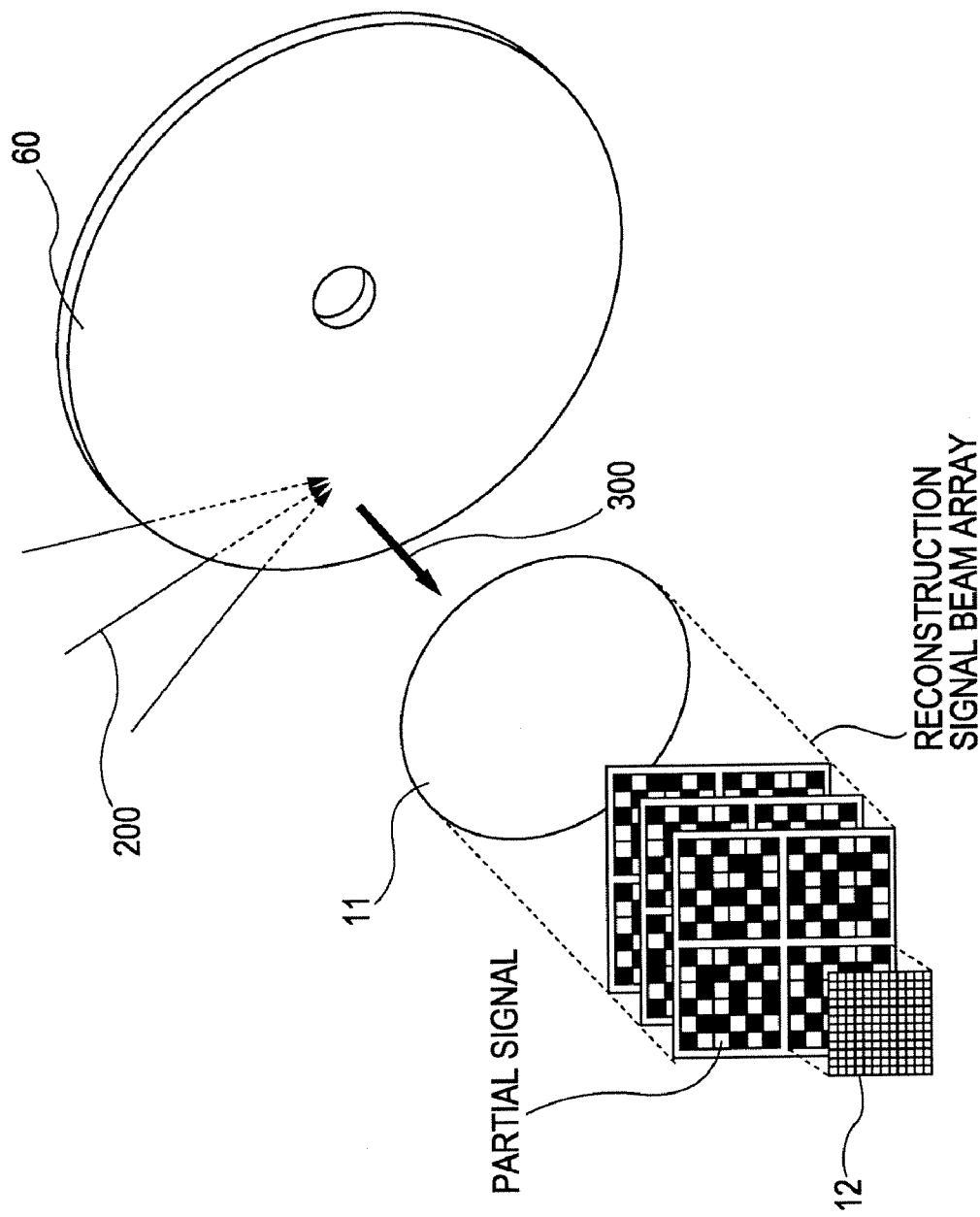
FIG. 3 illustrates the reception of a partial reconstruction signal beam corresponding to a multiplex-recorded data page.

FIG. 3 illustrates this operation. In this case, angular multiplex recording is to be carried out. A reconstruction signal beam is obtained by irradiating the hologram recording medium 60 with a reference beam 200 having a predetermined incident angle, and, for example, a partial signal beam 300c is received at the image sensor 12. Then, the incident angle of the reference beam 200 with respect to the hologram recording medium 60 is changed to obtain a different hologram reconstruction signal beam 300, a partial signal 300c of this hologram reconstruction signal beam 300 is received by the image sensor 12 in the same manner. At this time, the image sensor 12 is at the same position as when it received the previous partial signal beam, and is not moved at all. In other words, only partial signal beams that are at the same relative positions in different reconstruction signal beams are received continuously. This operation is repeated until the reception of all holograms multiplexed in the same position on the hologram recording medium 60 is completed. Then, the hologram recording medium 60 is rotated to another recording area at a different position, and the same light-receiving operation is repeated as described above.

Figure 4A:
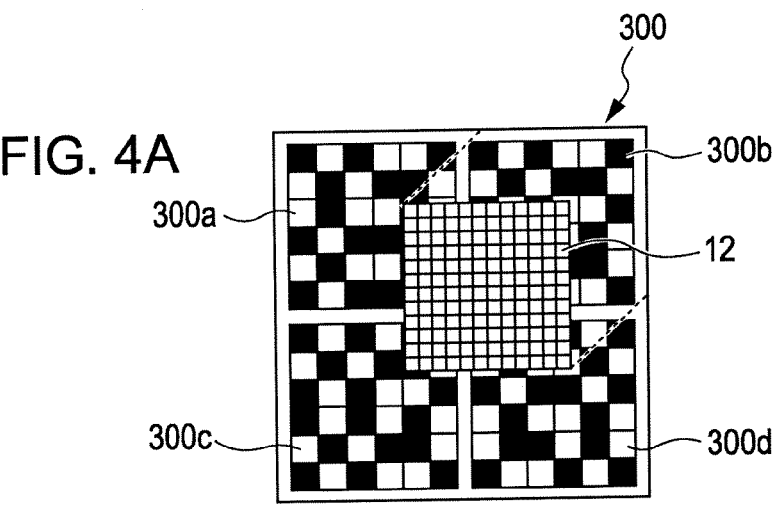
FIG. 4 illustrates the reception of a partial reconstruction signal beam by translationally moving the image sensor, shown in FIG. 1.
Figure 4B:
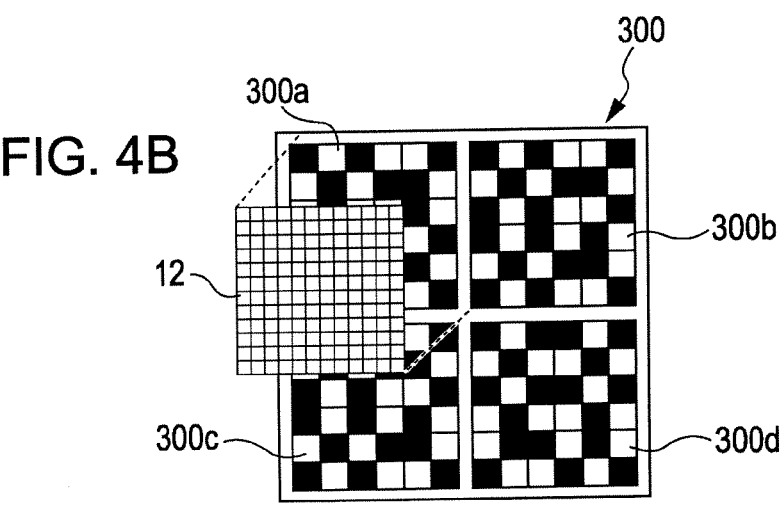
Figure 4C:
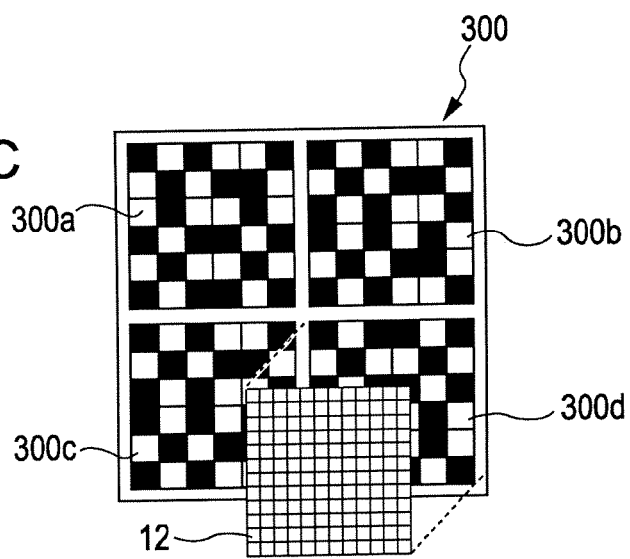
Figure 5:
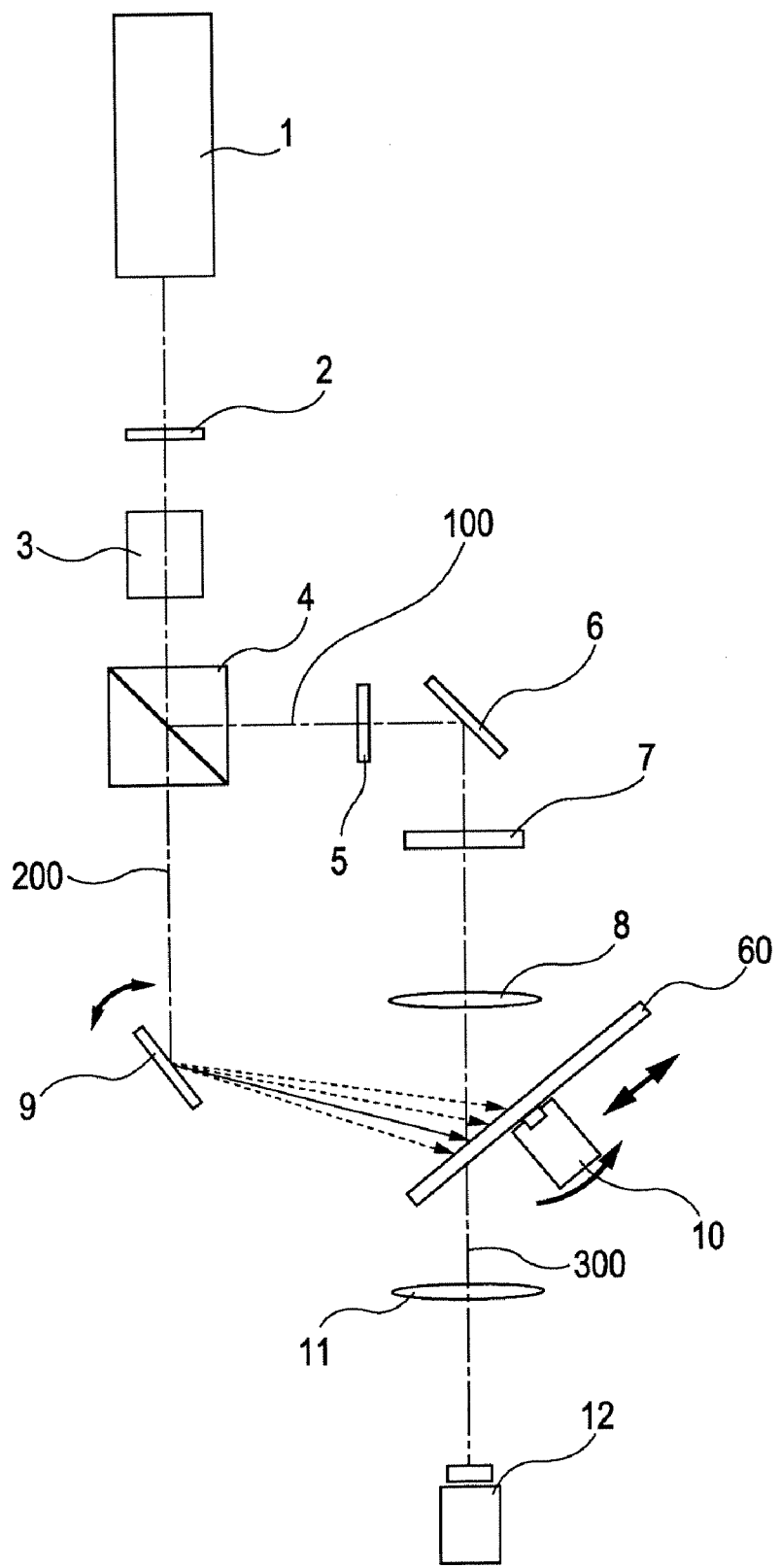
FIG. 5 is a block diagram illustrating a known structure of a typical angle-multiplexing volume hologram memory apparatus.
Figure 6B:
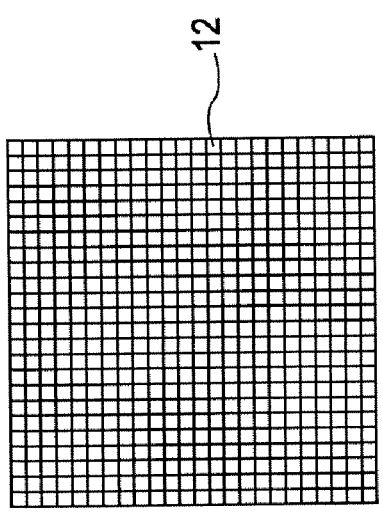
FIG. 6 illustrates oversampling of a hologram reconstructing signal.
Figure 6A:
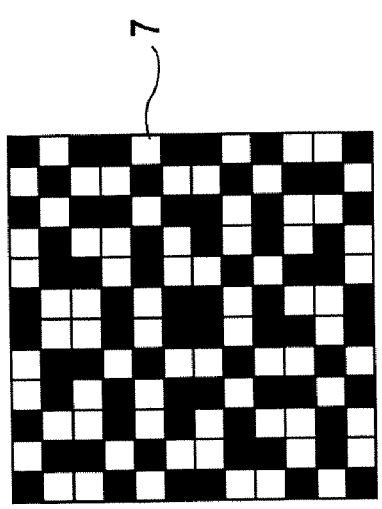
Figure 6C:
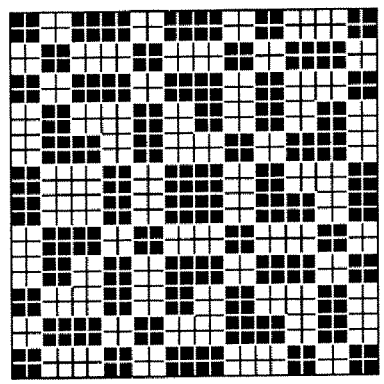

When the above-described operation for all areas on the hologram recording medium 60 is completed, the image sensor 12 is moved to positions illustrated in FIG. 4 so that partial signal beams from different positions in the reconstruction signal beam can be received, and the above-described operation is repeated. In the case illustrated in FIG. 4, the image sensor 12 is translationally moved to positions corresponding to the partial signals 300b, 300a, and 300d. The above-described operation is repeated until all signals recorded on the hologram recording medium 60 are reconstructed.

In general, compared with the amount of time required for rotating the hologram recording medium 60 and changing the angle of the reference beam, the amount of time required for moving the position of the image sensor is significantly longer. However, by carrying out the steps in the above-described reconstructing process, a reduction in the transfer rate due to the movement of the image sensor 12 can be minimized.

Instead of translationally moving the image sensor 12, as described above, for example, it is possible to, first, reconstruct the entire angle multiplex data of one recording area in the hologram recording medium 60, and then rotate the hologram recording medium 60 so as to proceed to the next recording region. More specifically, after the entire angular multiplex data at the position where the partial signal 300a is received is reconstructed, the image sensor 12 is moved to the position where the partial signal 300b is to be received. Here, the entire angular multiplex data is reconstructed, and the same operation is carried out after moving to the position where the partial signal 300c is to be received. Furthermore, the entire angular multiplex data is reconstructed, and the same operation is carried out after moving to the position where the partial signal 300d is to be received. In this way, the entire angular multiplex data recorded in this area is reconstructed. Subsequently, the hologram recording medium 60 is rotated, and the entire angular multiplex data recorded in the next recording area is reconstructed by the same operation.

Rotational angle control of the movable mirror 9, the translation movement control of the movable stage 13, and the rotational control of the hologram recording medium 60 may be carried out in various orders, different from that described above. However, when a partial signal beam received at once at the image sensor 12 corresponds to one complete piece of data (for example, one photograph), regardless of the order of the controls, the partial signal beams do not have to be combined by carrying out image processing at the image processing unit 15. A partial signal beam received by the image sensor 12 does not include one complete piece of data (i.e., the partial signal beam corresponds to, for example, half of a photograph), the image sensor 12 may carry out image processing later to combine the received partial signal beams with partial signal beams corresponding to the remaining data.

According to this embodiment, the image sensor 12 that includes a number of pixels substantially the same as that of the spatial modulator 7 is used to carry out oversampling of part of the hologram reconstruction signal beam 300. Then, the image sensor 12 is translationally moved to carry out oversampling of other parts of the hologram reconstruction signal beam 300. This operation is repeated to receive the entire hologram reconstruction signal beam 300 and generate image data. In this way, the number of pixels included in the image sensor 12 is not increased to a number greater than that included in the spatial modulator 7, and, thus oversampling can be easily carried out during hologram reconstruction and at low.

The present invention is not limited to the above-described described embodiments, and various modifications having different structures, functions, operations, and advantages may be provided within the scope of the invention. For example, in the above-described embodiment, the hologram reconstruction signal beam 300 is split into four partial beam signals. The number of partial beam signals the hologram reconstruction signal beam 300 is to be split into is not limited to four, and the hologram reconstruction signal beam may be split into any number of partial beam signals depending on the number of pixels of the image sensor 12 and the ease of optical design.

In the above-described embodiment, an angular multiplexing technique is employed as a reconstruction method. Other multiplexing methods, such as shift multiplexing or phase multiplexing, may be employed as a reconstructing method. This is the same when reconstructing a hologram recording without employing a multiplexing method. In such a case, multiplex reconstruction control is not required. Furthermore, in the above-described embodiment, the image sensor 12 is moved. However, the reconstructing optical system or both the image sensor 12 and the reconstructing optical system may be moved.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram reconstructing apparatus configured to irradiate a hologram recording medium with a reconstructing reference beam, the hologram recording medium storing an interference pattern of a signal beam spatially modulated by data displayed on a spatial modulator and a reference beam emitted simultaneously with the signal beam, and to reconstruct data by capturing a reconstruction signal beam generated at the hologram recording medium being irradiated, the hologram reconstructing apparatus comprising:

image pickup means for receiving a partial reconstruction signal beam by a full light-receiving plane, the partial reconstruction signal beam constituting less than a whole of the reconstruction signal beam;

moving means for relatively moving the light-receiving plane of the image pickup means within an irradiation range of the reconstruction signal beam to another position, said image pickup means receiving another partial reconstruction signal beam constituting less than the whole of the reconstruction signal beam at the another position; and an image processing unit configured to reconstruct the reconstruction signal beam by combining plural partial reconstruction signal beams that correspond to the entire irradiation range.

2. The hologram reconstructing apparatus according to claim 1, wherein the number of light-receiving pixels of the image pickup means is less than or equal to the number of display pixels of the spatial modulator.

3. The hologram reconstructing apparatus according to claim 1, wherein reconstruction data is obtained by oversampling the partial reconstruction signal beam received by the image pickup means.

4. The hologram reconstructing apparatus according to claim 1, wherein the light-receiving plane of the image pickup means is matched with an imaging plane of the reconstruction signal beam and the image pickup means is translationally moved on the imaging plane by the moving means.

5. The hologram reconstructing apparatus according to claim 1, wherein, when the data is multiplex-recorded in one recording area in the hologram recording medium, all partial reconstruction signal beams corresponding to the data multiplex-recorded while the image pickup means is fixed, and then the image pickup means is moved by the moving means so as to receive other partial reconstruction signal beams.

6. The hologram reconstructing apparatus according to claim 5, wherein the data is multiplex-recorded in the hologram recording medium by angular multiplexing or polytopic multiplexing.

7. The hologram reconstructing apparatus according to claim 1, wherein the image pickup means is a CCD or a CMOS image sensor.

8. The apparatus of claim 1, wherein the image pickup means further includes means for magnifying the reconstruction signal beam so that a size of the light-receiving plane is smaller than a size of an entire reconstruction image corresponding to the reconstruction signal beam.

9. A hologram reconstructing apparatus configured to irradiate a hologram recording medium with a reconstructing reference beam, the hologram recording medium storing an interference pattern of a signal beam spatially modulated by data displayed on a spatial modulator and a reference beam emitted simultaneously with the signal beam, and to reconstruct data by capturing a reconstruction signal beam generated at the hologram recording medium being irradiated, the hologram reconstructing apparatus comprising:

image pickup means for receiving a partial reconstruction signal beam by a full light-receiving plane, the partial reconstruction signal beam constituting part of the reconstruction signal beam; and moving means for relatively moving the light-receiving plane of the image pickup means within an irradiation range of the reconstruction signal beam, wherein all information included in the reconstruction signal beam is reconstructed by receiving the reconstruction signal beam corresponding to the entire irradiation range by relatively moving the image pickup means within the irradiation range of the reconstruction signal beam, and when the data is multiplex-recorded in a first recording area of the hologram recording medium, after receiving all partial reconstruction signal beams corresponding to the data multiplex-recorded while the image pickup means is fixed and after relatively moving the hologram recording medium so that a second recording area in the hologram recording medium is irradiated with the reconstructing reference beam, partial reconstruction signal beams of the reconstruction signal beam are received by the image pickup means at the second recording area such that all of the data that is receivable at the fixed position and recorded in the hologram recording medium is received, and then the image pick up means is moved by the moving means so as to receive other partial signal beams.

10. The hologram reconstructing apparatus according to claim 9, wherein the data is multiplex-recorded in the hologram recording medium by employing angular multiplexing or polytypic multiplexing.

11. A hologram reconstruction method of irradiating a hologram recording medium with a reconstructing reference beam, the hologram recording medium storing an interference pattern of a signal beam spatially modulated by data displayed on a spatial modulator and a reference beam emitted simultaneously with the signal beam, and reconstructing data by capturing a reconstruction signal beam generated at the hologram recording medium being irradiated, the method comprising:

receiving a partial reconstruction signal beam by a full light-receiving plane of an image pickup unit, the partial reconstruction signal beam constituting less than a whole of the reconstruction signal beam;

relatively moving, with a moving unit, the light-receiving plane of the image pickup unit within an irradiation range of the reconstruction signal beam to another position;

receiving, with said image pickup unit, another partial reconstruction signal beam constituting less than the whole of the reconstruction signal beam at the another position; and reconstructing, with an image processing unit, the reconstruction signal beam by combining plural partial reconstruction signal beams that correspond to the entire irradiation range.

12. The hologram reconstruction method according to claim 11, wherein the size of an image corresponding to the reconstruction signal beam received by the image sensor is larger than the light-receiving plane of the image sensor.

13. The apparatus of claim 12, further comprising:

an optical unit configured to magnify the reconstruction signal beam so that a size of the light-receiving plane is smaller than a size of an entire reconstruction image corresponding to the reconstruction signal beam.

14. The method of claim 11, further comprising:

magnifying the reconstruction signal beam so that a size of the light-receiving plane is smaller than a size of an entire reconstruction image corresponding to the reconstruction signal beam.

15. A hologram reconstructing apparatus configured to irradiate a hologram recording medium with a reconstructing reference beam, the hologram recording medium storing an interference pattern of a signal beam spatially modulated by data displayed on a spatial modulator and a reference beam emitted simultaneously with the signal beam, and to reconstruct data by capturing a reconstruction signal beam generated at the hologram recording medium being irradiated, the hologram reconstructing apparatus comprising:

an image pickup unit that receives plural partial reconstruction signal beams by a full light-receiving plane, each of the partial reconstruction signal beams constituting less than a whole of the reconstruction signal beam;

a moving unit that relatively move the light-receiving plane of the image pickup means within an irradiation range of the reconstruction signal beam; and an image processing unit configured to reconstruct the reconstruction signal beam by combining the plural partial reconstruction signal beams that correspond to the entire irradiation range.

\* \* \* \* \*